United States Patent
Gorospe Alviar et al.

(10) Patent No.: US 9,364,760 B2
(45) Date of Patent: Jun. 14, 2016

(54) SYSTEM AND METHOD FOR DETECTING GAME CLIENT MODIFICATION THROUGH SCRIPT INJECTION

(71) Applicant: KABAM, INC., San Francisco, CA (US)

(72) Inventors: Mark Vincent Gorospe Alviar, San Francisco, CA (US); Cuong Le Ngo, Mountain View, CA (US); Pascal Aschwanden, San Mateo, CA (US); Kevin Kang So, San Jose, CA (US)

(73) Assignee: KABAM, INC., San Francisco, CA (US)

( * ) Notice: Subject to any disclaimer, the term of this patent is extended or adjusted under 35 U.S.C. 154(b) by 0 days.

(21) Appl. No.: 14/930,568

(22) Filed: Nov. 2, 2015

(65) Prior Publication Data

US 2016/0051899 A1    Feb. 25, 2016

Related U.S. Application Data

(63) Continuation of application No. 13/589,473, filed on Aug. 20, 2012, now Pat. No. 9,174,118.

(51) Int. Cl.
| | | |
|---|---|---|
| *A63F 13/71* | (2014.01) | |
| *A63F 13/35* | (2014.01) | |
| *A63F 13/95* | (2014.01) | |
| *G06F 3/0484* | (2013.01) | |
| *H04L 29/06* | (2006.01) | |

(52) U.S. Cl.
CPC .............. *A63F 13/71* (2014.09); *A63F 13/35* (2014.09); *A63F 13/95* (2014.09); *G06F 3/04842* (2013.01); *H04L 63/1425* (2013.01); *H04L 63/1466* (2013.01)

(58) Field of Classification Search
CPC ............................... A63F 13/71; A63F 13/35
USPC .......................................................... 463/42
See application file for complete search history.

(56) References Cited

U.S. PATENT DOCUMENTS

| | | | |
|---|---|---|---|
| 7,779,399 | B2 | 8/2010 | Huang et al. |
| 8,078,740 | B2 | 12/2011 | Franco et al. |
| 2009/0249489 | A1 | 10/2009 | Livshits et al. |
| 2011/0016528 | A1 | 1/2011 | Zhou et al. |
| 2011/0252475 | A1 | 10/2011 | Mui et al. |

*Primary Examiner* — Jason Skaarup
(74) *Attorney, Agent, or Firm* — Sheppard Mullin Richter & Hampton LLP

(57) ABSTRACT

Script injection in game clients used to access an online, interactive game may be detected. This detection may be performed on behalf of the entity operating the game in order to reduce cheating by users that relies on client modification through script injection. Detection of script injection may be performed on a recurring basis.

8 Claims, 4 Drawing Sheets

SYSTEM AND METHOD FOR DETECTING GAME CLIENT MODIFICATION THROUGH SCRIPT INJECTION

FIELD

The disclosure relates to detecting client modification on game clients in an interactive online game to prevent cheating by users.

BACKGROUND

In interactive, online games, various means are employed by users to "cheat". These means include client modification, in which a game client providing access to a game on a client computing platform is modified (or information generated by the client is modified) to the advantage of the user of the client computing platform. For interactive, online games that employ a game client executed by a web browser through scripts, such an exploit may be attempted via script injection. In doing so, a user may employ a script injection extension, and/or other script injection tools that have been developed to facilitate user customization of webpages and/or websites for more benign purposes.

SUMMARY

One aspect of the disclosure relates to detecting script injection in game clients used to access an online, interactive game. This detection may be performed on behalf of the entity operating the game in order to reduce cheating by users that relies on client modification through script injection. Detection of script injection may be performed on a recurring basis. This may facilitate detection of injection that takes place after page load, result in detection being performed even if the scanning script that performs the detection is overwritten, and/or provide other enhancements.

In a system that provides an online, interactive game to users, the system may include a server hosting the game, client computing platforms implemented by users to access the game, and/or other components.

A client computing platform in this system may be configured to execute a game client module, a scanning script module, a results module, and/or other modules.

The game client module may be configured to execute one or more scripts to define a view of the game for presentation to the user on the computing platform. The view of the game may facilitate participation by the user in the game. The game client module may be implemented by a web browser executing the one or more scripts.

The injection detection module may be configured to scan the one or more scripts and/or information generated by the game client module to detect script injection indicators. Separate scans may initiated at intervals in an ongoing manner throughout a session of the interactive game. This may result in detection of injection that takes place after an initial page load that initiates the session. The performance of the scans at intervals may result in performance of the scans even after a scanning script that causes the scans to be performed has been overwritten by a script injection. The intervals at which the scans are initiated may be stochastic. The injection detection module may be further configured such that, responsive to a scan not detecting any script injection indicators in the scripts and/or the information generated by the game client module, the injection detection module scans an application registry of applications running on the client computing platform for processes of an application that causes the one or more processors to perform script injection.

The results module may be configured to communicate results of the scans performed by the injection detection module to the server. These may include AJAX communications, and/or other communications.

A server hosting the online, interactive game may be configured to execute one or more of a game module, a scanning script module, a results reception module, and/or other modules.

The game module may be configured to host the interactive game. This may include executing an instance of an interactive game, determining game information from the executed instance, and causing the game information to be transmitted to the client computing platform associated with a user participating in the game. Control inputs to the game received by the client computing platform may be communicated to the game module, and corresponding actions in the instance of the game may be initiated by the game module.

The scanning script module may be configured to provide a scanning script to the client computing platform that causes the client computing platform to scan one or more scripts associated with a game client executed on the client computing platform and/or information generated by execution of the game client on the client computing platform to detect script injection indicators. The scanning script module may be configured to dynamically name the scanning script to inhibit overwriting of the scanning script by script injection. Dynamically naming the scanning script may include determining a session script identification for the scanning script, naming the scanning script with the session script identification, communicating the session script identification to the client computing platform, and initiating transmission to the client of the scanning script named with the session identification.

The results reception module may be configured to receive results of scans from the client computing platform. The scans may include the scans performed by the scanning script.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
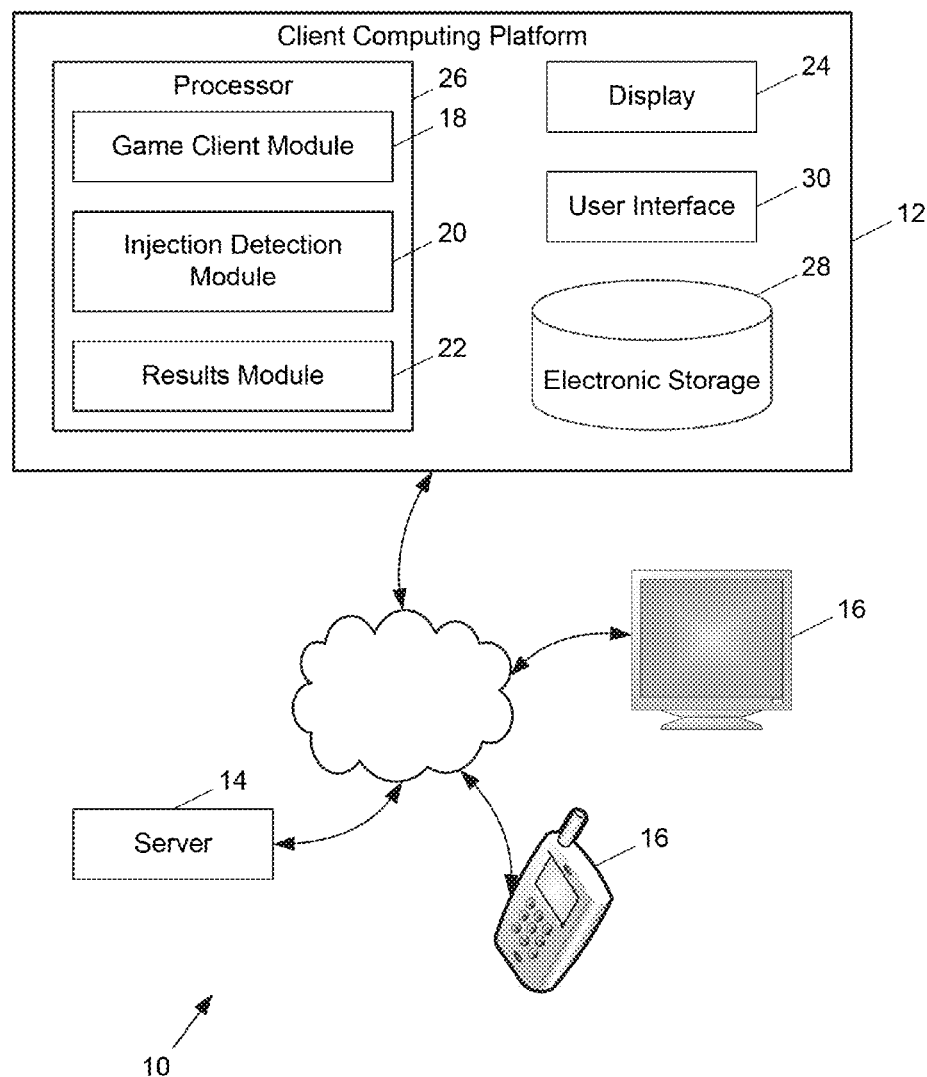
FIG. 1 illustrates a system configured to provide access to an interactive game to a user.

FIG. 1 illustrates a system 10 configured to provide access to an interactive game to a user. The game may be within a virtual space provided to the user. System 10 may be configured to inhibit modification of a client application through which the user accesses the interactive game. This may reduce cheating, enhance fairness between users, ensure uniformity of game experience across users, and/or provide other enhancements. In some implementations, system 10 may be configured to inhibit script injection on a client run through a web browser. System 10 may include one or more of a client computing platform 12, a server 14, and/or other components.

Client computing platform 12 may be configured to communicate with server 14 in a client/server configuration. As is discussed herein, server 14 may be configured to host the interactive game. In implementations in which the game is provided within a virtual space, this may include hosting the virtual space. Hosting the interactive game may include executing an instance of the game, and providing the user access to the game through client computing platform 12. The interactive game (and/or the corresponding virtual space) may be shared with one or more other users. Such users may access the game through one or more other client computing platforms 16. In some implementations, client computing platform 12 may be configured to execute one or more of a game client module 18, an injection detection module 20, a results module 22, and/or other modules.

Game client module 18 may be configured to provide access for the user to the online game. This may include presenting a view of the game to the user (e.g., via a display 24), receiving control inputs from the user, and/or facilitating other interactions of the user with the game. The game may be provided in a virtual space. In such implementations, game client module 18 may be configured to present views of the virtual space to the user. Views of the game presented to the user may include one or more of a character (and/or other objects) under control of the user, one or more characters (and/or other objects) under control of other users, non-player characters, information related to status, score, inventory, game situation, character or player level, and/or other information associated with the game.

Game client module 18 may be implemented, at least in part, in a scripting language that is executed by a web browser to present the views of the game. The scripting language may include, for example, one or more of the JavaScript, VBScript, XUL, XSLT, and/or other scripting languages. During a game session (e.g., opened responsive to the user logging in to the game on server 14), at least some of the scripts associated with game client module 18 may be received from server 14. This may be accomplished at the beginning of the game session, as the game session is ongoing, at the end of the game session, and/or at other times. At least some of the scripts associated with game client module 18 may have been previously stored on client computing platform 12, for use during the game session (e.g., during a previous game session, while the user is not logged in to server 14, and/or at other times). During the game session, game client module 18 may send and/or receive information to and/or from server 14. Such information may include game information to be implemented by game client module 18 to determine views of the game, game state, and/or other information related to the game.

In some implementations, an unfair advantage in the game may be gained by the user by modifying game client module 18, and/or information received from server 14 related to the game. For example, the user may want to gain resources, increase stamina, strength, or other attributes, and/or obtain other advantages over users without modified versions of game client module 18. To this end, the user may attempt to modify game client module 18 and/or received information through a technique referred to as "script injection." This technique is generally known, and typically involves introducing, or "injecting", code into scripts being executed by a web browser (or other type of application). In general, script injection may be implemented benignly by users customize the functionality and/or appearance of various types of websites. For example, the browser extension Greasemonkey may implemented by users in this way. However, within the context of the interactive game hosted by server 14, use of script injection may be an undesirable activity because of the impact it has on the fairness and equity provided by the game.

Injection detection module 20 may be configured to detect scrip injection being performed on client computing platform 12. This may be accomplished by scanning game client module 18, information generated by game client module 18, an application registry on client computing platform 12, and/or performing other analysis. Such scans may be performed intermittently throughout a game session. This may detect injections that take place after the initial web page load that initiates the game session. Injection detection module 20 may include one or more scanning scripts that perform the scans and/or other analysis.

In performing scans for evidence of script injection, injection detection module 20 may be configured to scan game client module 18 and/or information generated by game client module 18 for script injection identifications. This may include scanning the Document Object Model for modifications, data structures for overwriting, and/or other analysis. Responsive to not detecting an script injection identifications, game client module 18 may be configured to scan an application registry of client computing platform 12 to detect applications and/or processes associated with script injection. An updated list of applications and/or processes associated with script injection may be maintained by injection detection module 20. This may include obtaining an updated list from server 14 and/or other sources.

Injection detection module 20 may be configured such that separate scans may be initiated at intervals in an ongoing manner throughout a game session by the user. A separate scan may refer to a routine implemented by injection detection module 20 to attempt to detect script injection identifications and/or applications/processes associated with script injection, as described herein. Performing separate scans at intervals through the game session may facilitate detection of script injection that occurs after an initial page load of the game session. In implementations in which injection detection module 20 performs separate scans at intervals, the scanning script(s) associated with performing the scans may still be executed even after these scanning script(s) are overwritten through script injection. Performing the scans in intervals allows for the creation of an anonymous function, instead of from a function defined in the code which can easily be overwritten before execution. The anonymous function creates a layer of encapsulation preventing access to its code after it is created and executed. This may thwart attempts by the user to first overwrite at least a portion of injection detection module 20, and then modify game client module 18 after injection detection module 20 is no longer able to detect script injection. Injection detection module 20 may be configured such that the intervals at which scans are initiated are periodic (e.g., at regular intervals), stochastic (e.g., random or pseudo-random), and/or determined in other ways.

Results module 22 may be configured to communicate results of scans performed by injection detection module 20 to server 14. For example, responsive to performance of a scan that does not detect the presence of script injection, results module 22 may communicate the result that game client module 18 has not been modified to server 14. Responsive to detection of script injection (or evidence of script injection), results module 22 may be configured to communicate such detection to server 14. This may include communicating that script injection was detected, the specific evidence detected, an indication of the type of evidence detected, and/or other information. In some implementations, results module 22 may be configured to generate AJAX commands with the results to a game database maintained by server 14.

Server 14 and/or client computing platforms 12, 16 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 14 and/or client computing platforms 12, 16 may be operatively linked via some other communication media.

Client computing platform 12 may include one or more of a display 24, one or more processors 26, electronic storage 28, a user interface 30, and/or other components. By way of non-limiting example, client computing platform 12 may include one or more of a desktop computer, a laptop computer, a handheld computer, a tablet computing platform, a NetBook, a Smartphone, a gaming console, and/or other computing platforms.

Processor(s) 26 is configured to provide information processing capabilities in client computing platform 12. As such, processor 26 may include one or more of a digital processor, an analog processor, a digital circuit designed to process information, an analog circuit designed to process information, a state machine, and/or other mechanisms for electronically processing information. Although processor 26 is shown in FIG. 1 as a single entity, this is for illustrative purposes only. In some implementations, processor 26 may include a plurality of processing units. The processor 46 may be configured to execute modules 18, 20, and/or 22 by software; hardware; firmware; some combination of software, hardware, and/or firmware; and/or other mechanisms for configuring processing capabilities on processor 26.

It should be appreciated that although modules 18, 20, and 22 are illustrated in FIG. 1 as being co-located within a single processing unit, in implementations in which processor 26 includes multiple processing units, one or more of modules 18, 20, and/or 22 may be located remotely from the other modules. The description of the functionality provided by the different modules 18, 20, and/or 22 described below is for illustrative purposes, and is not intended to be limiting, as any of modules 18, 20, and/or 22 may provide more or less functionality than is described. For example, one or more of modules 18, 20, and/or 22 may be eliminated, and some or all of its functionality may be provided by other ones of modules 18, 20, and/or 22. As another example, processor 26 may be configured to execute one or more additional modules that may perform some or all of the functionality attributed below to one of modules 18, 20, and/or 22.

Electronic storage 28 may comprise electronic storage media that electronically stores information. The electronic storage media of electronic storage 28 may include one or both of system storage that is provided integrally (i.e., substantially non-removable) with client computing platform 12 and/or removable storage that is removably connectable to client computing platform 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 26, information received from server 14, information received from client computing platforms 16, and/or other information that enables client computing platform 12 to function as described herein.

User interface 30 may include one or more devices configured to receive control inputs from the user. By way of non-limiting example, user interface 30 may include one or more of a keyboard, a keypad, a button, a key, a mouse, a joystick, a track ball, a touch sensitive surface, a switch, a microphone, and/or other devices.

Figure 2:
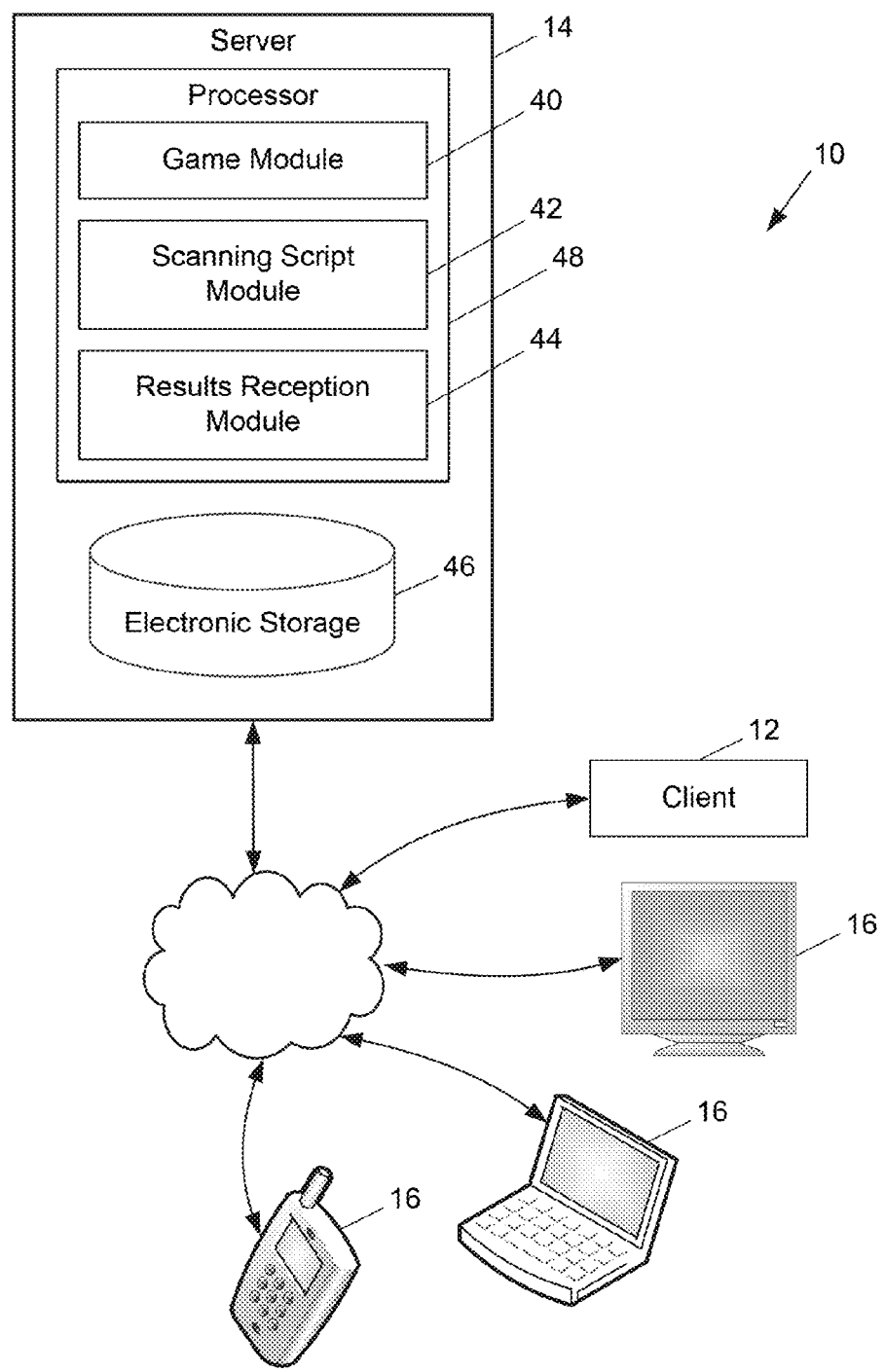
FIG. 2 illustrates a system configured to host an interactive game to a network for a user that accesses the game via a client computing platform.

FIG. 2 illustrates various implementations of system 10. As can be seen in FIG. 2, server 14 may be configured to execute one or more of a game module 40, a scanning script module 42, a results reception module 44, and/or other computer program modules.

Game module 40 may be configured to host the interactive game. The interactive game may be hosted for users of client computing platforms 12, 16 over a network. This may include executing an instance of the game, and implementing the instance of the game to determine game information. The game information may be communicated to client computing platforms 12, 16 to enable client computing platforms 12, 16 to provide access to the game, as described herein. In implementations in which the game is in a virtual space, the instance of the game may include an instance of the virtual space. The game information may include one or more of game state information, virtual space state information, view information, and/or other information that facilitates access to the game on client computing platforms 12, 16. Control inputs entered by the users to client computing platforms 12, 16 may be received by game module 40. Corresponding actions may be executed in the instance of the game based on the received control inputs.

Scanning script module 42 may be configured to provide scanning scripts to client computing platforms 12, 16. The scanning scripts may be implemented on client computing platforms 12, 16 in injection detection modules (e.g., the same as or similar to injection detection module 20 shown in FIG. 1 and described herein) to detect script injection for the purpose of modifying a game client. The game client may be the same as or similar to game client module 18 (shown in FIG. 1 and described herein). To inhibit the scanning scripts from being rendered ineffective by script injection (e.g., by overwriting a scanning script to prevent detection of further script injection), scanning script module 42 may be configured to name the scanning scripts dynamically for different game sessions. This may prevent a single script injection process from detecting a scanning script for the purpose of overwriting.

In order to dynamically name a scanning script, responsive to a game session being initiated by the user of client computing platform 12, scanning script module 42 may determine a session script identification for the scanning script. The scanning script identification may be an alphanumeric string used to identify the scanning script for the initiated game session. The session script identification may be determined stochastically, based on a rotating set of identifications, and/or determined in other ways.

Once the session script identification is determined, scanning script module 42 may be configured to communicate the session script identification to client computing platform 12. This communication may be encrypted, and/or protected in other ways. The session script identification may be communicated to client computing platform 12 with instructions to execute the scanning script. The session script identification may be communicated to client computing platform 12 as a value for a variable in instructions already stored on client computing platform 12 that will cause the scanning script with the session script identification to be executed. Scanning script module 42 may be configured to initiate transmission of the scanning script, named based on the session script identification (e.g., with the session script identification in the filename), to client computing platform 12.

Results reception module 44 may be configured to receive results of scanning performed according to the scanning scripts from client computing platforms 12, 16. These results may include indications that no script injection was detected, indications that script injection was detected, and/or other results. Results reception module 44 may be configured to record results received to non-transient electronic storage (e.g., electronic storage 46). For example, results may be recorded to a database maintained on server 14.

Server 14 may include one or more of a processor 48, electronic storage 46, and/or other components. Processor(s) 48 is configured to provide information processing capabilities in server 14. As such, processor 48 may include one or more of a digital processor, an analog processor, a digital circuit designed to process information, an analog circuit designed to process information, a state machine, and/or other mechanisms for electronically processing information. Although processor 48 is shown in FIG. 2 as a single entity, this is for illustrative purposes only. In some implementations, processor 46 may include a plurality of processing units. These processing units may be physically located within the same device, or processor 48 may represent processing functionality of a plurality of devices operating in coordination. The processor 48 may be configured to execute modules 40, 42, and/or 44 by software; hardware; firmware; some combination of software, hardware, and/or firmware; and/or other mechanisms for configuring processing capabilities on processor 48.

It should be appreciated that although modules 40, 42, and 44 are illustrated in FIG. 2 as being co-located within a single processing unit, in implementations in which processor 46 includes multiple processing units, one or more of modules 40, 42, and/or 44 may be located remotely from the other modules. The description of the functionality provided by the different modules 40, 42, and/or 44 described below is for illustrative purposes, and is not intended to be limiting, as any of modules 40, 42, and/or 44 may provide more or less functionality than is described. For example, one or more of modules 40, 42, and/or 44 may be eliminated, and some or all of its functionality may be provided by other ones of modules 40, 42, and/or 44. As another example, processor 48 may be configured to execute one or more additional modules that may perform some or all of the functionality attributed below to one of modules 40, 42, and/or 44.

Electronic storage 46 may be the same as or similar to electronic storage 28 (shown in FIG. 1 and described herein).

It will be appreciated that electronic storage 46 may be configured to have a larger capacity than storage on client computing platform 12.

Figure 3:
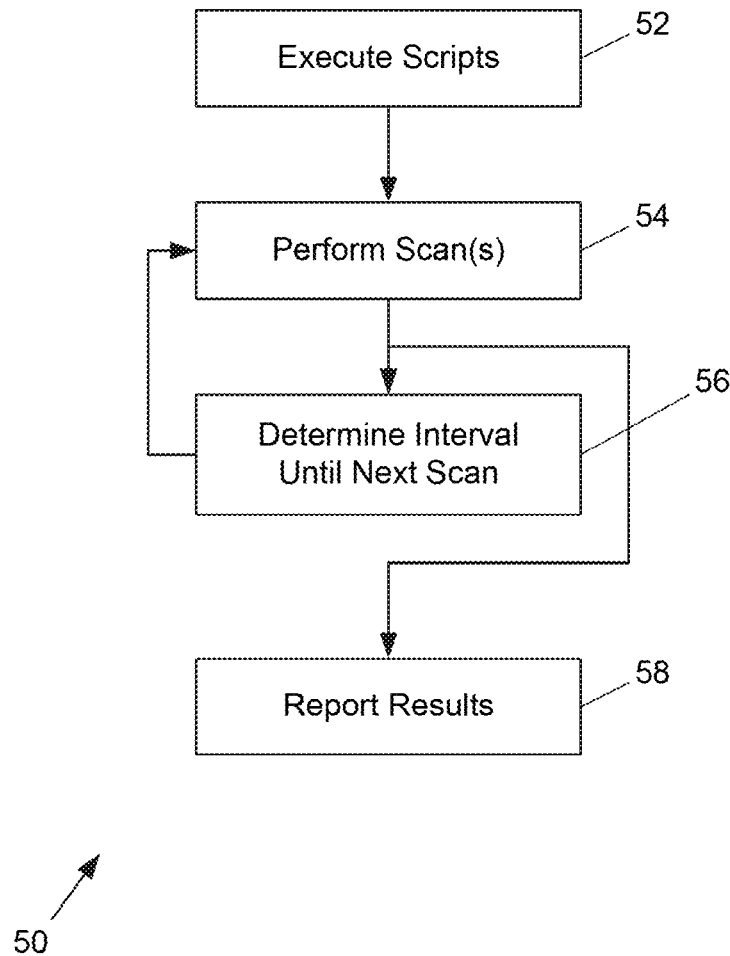
FIG. 3 illustrates a method of providing access to an interactive game to a user.

FIG. 3 illustrates a method 50 of providing access to an interactive game to a user. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 3 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, one or more scripts may be executed to determine a view of the interactive game for presentation to the user. The view of the game may facilitate participation in the game by the user. Execution of the scripts may implement game information received from a server hosting the interactive game. In some implementations, operation 52 may be performed by a game client module the same as or similar to game client module 18 (shown in FIG. 1 and described herein).

At an operation 54, the one or more scripts and/or information generated by the one or more scripts may be scanned to detect script injection. An application registry may be scanned for applications and/or processes associated with script injection. In some implementations, operation 54 may be performed by an injection detection module the same as or similar to injection detection module 20 (shown in FIG. 1 and described herein).

At an operation 56, an interval until a next scan is to be performed may be determined. This determination may be stochastic, based on information received from the server, and/or determined in other ways. In some implementations, operation 56 may be performed by an injection detection module the same as or similar to injection detection module 20 (shown in FIG. 1 and described herein). Method 50 may loop back to operation 54 at the interval determined at operation 56. This may result in the performance of a plurality of scans of the one or more scripts and/or information generated thereby. The plurality of scans may be performed at the intervals in an ongoing manner throughout a game session.

At an operation 58, results of the scan(s) performed at operation 54 may be communicated to the server. This may include initiating transmission of the results to the server. In some implementations, operation 58 may be performed by a results module the same as or similar to results module 22 (shown in FIG. 1 and described herein).

Figure 4:
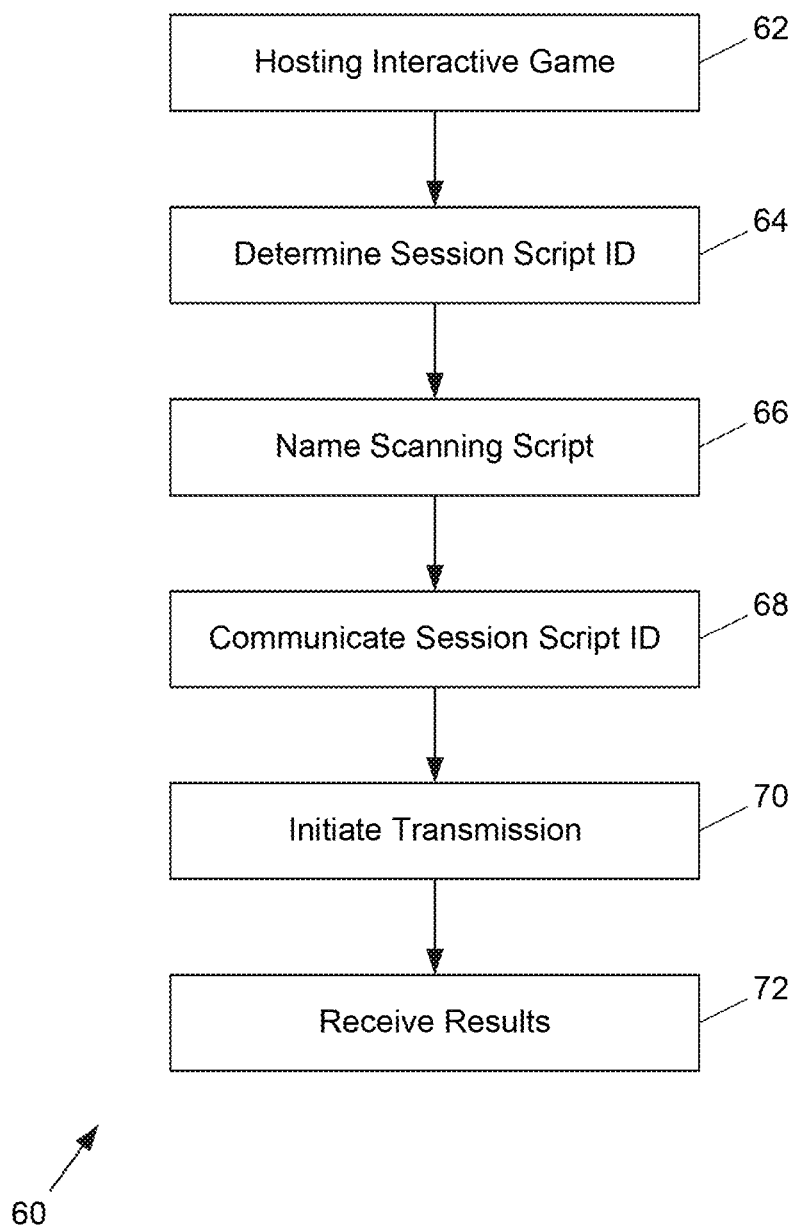
FIG. 4 illustrates a method of hosting an interactive game to a network for a user that accesses the game via a client computing platform.

FIG. 4 illustrates a method 60 of hosting an interactive game over a network for a user that accesses the interactive game via a client computing platform. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 4 and described below is not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, the interactive game is hosted by executing an instance of the game, determining game information from the executed instance, and causing the game information to be transmitted to the client computing platform. In some implementations, operation 62 may be performed by a game module the same as or similar to game module 40 (shown in FIG. 2 and described herein).

By operation 64, 66, and 68 a scanning script may be provided to the client computing platform. The scanning script may be configured to cause the client computing platform to scan one or more scripts associated with a game client executed on the client computing platform and/or information thereby to detect scrip injection indicators, and/or to cause the client computing platform to perform other scans or analysis. The scanning script may be dynamically named in order to inhibit overwriting of the scanning script by script injection.

At operation 64, a session script identification for the scanning script may be determined. This determination may be stochastic, based on a set of rotating identifications, and/or determined in other ways. Operation 64 may determine the session script identification for the scanning script for a single game session, for use over some number of game sessions, for use until replaced, and/or for other periods of time. In some implementations, operation 64 may be performed by a scanning script module the same as or similar to scanning script module 42 (shown in FIG. 2 and described herein).

At an operation 66, the scanning script may be named with the session script identification. This may include including the session script identification in a filename of an electronic file with the scanning script, and/or other naming operations. In some implementations, operation 66 may be performed by a scanning script module the same as or similar to scanning script module 42 (shown in FIG. 2 and described herein).

At an operation 68, the session script identification may be communicated to the client computing platform. In some implementations, operation 68 may be performed by a scanning script module the same as or similar to scanning script module 42 (shown in FIG. 2 and described herein).

At an operation 70, transmission of the scanning script as named at operation 68 to the client computing platform may be initiated. In some implementations, operation 70 may be performed by a scanning script module the same as or similar to scanning script module 42 (shown in FIG. 2 and described herein).

At an operation 72, results of scans performed in accordance with the scanning script may be received. In some implementations, operation 72 may be performed by a results reception module the same as or similar to results reception module 44 (shown in FIG. 2 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to host an interactive game over a network for a user that accesses the interactive game via a client computing platform, the system comprising:

one or more processors configured by machine-readable instructions to:

host an interactive game by executing an instance of an interactive game, to determine game information from the executed instance, and to cause the game information to be transmitted to a client computing platform associated with a first user participating in the game;

provide a scanning script to the client computing platform that causes the client computing platform to scan one or more name scripts associated with a game client executed on the client computing platform and/or information generated by execution of the game client on the client computing platform to detect script injection indicators, wherein providing the scanning script comprises:

determining a session script identification for the scanning script provided for the individual game session;

dynamically re-naming the scanning script such that at least a portion of the name of the scanning script for the individual game session includes the session script identification;

communicating the session script identification to the client computing platform; and initiating transmission to the client computing platform of the scanning script named with the session script identification causing the client computing platform to initiate separate scans at intervals in an ongoing manner throughout the individual game session.

2. The system of claim 1, wherein the one or more processors are configured by machine-readable instructions such that the session script identification is determined stochastically.

3. The system of claim 1, wherein the one or more processors are configured by machine-readable instructions such that the scanning script is provided to the client computing platform on a per game session basis.

4. The system of claim 1, wherein the one or more processors are configured by machine-readable instructions to receive results of scans performed by the client computing platform during execution of the scanning script.

5. A computer-implemented method of hosting an interactive game over a network for a user that accesses the interactive game via a client computing platform, the method being implemented in a server comprising one or more processors, the method comprising:

hosting an interactive game by executing an instance of an interactive game, determining game information from the executed instance, and causing the game information to be transmitted to a client computing platform associated with a first user participating in the game;

providing a scanning script to the client computing platform that causes the client computing platform to scan one or more game scripts associated with a game client executed on the client computing platform and/or information generated by execution of the game client on the client computing platform to detect script injection indicators, wherein execution of the game client presents views of the game to the user based on received game information, and wherein providing the scanning script comprises:
  determining a session script identification for the scanning script provided for the individual game session;
  dynamically re-naming the scanning script such that at least a portion of the name of the scanning script for the individual game session includes the session script identification;
  communicating the session script identification to the client computing platform; and
  initiating transmission to the client computing platform of the scanning script named with the session script identification causing the client computing platform to initiate separate scans at intervals in an ongoing manner throughout the individual game session.

6. The method of claim 5, wherein the session script identification is determined stochastically.

7. The method of claim 5, wherein the scanning script is provided to the client computing platform on a per game session basis.

8. The method of claim 5, further comprising receiving results of scans performed by the client computing platform during execution of the scanning script.

* * * * *